United States Patent [19]

Peppers

[11] Patent Number: 4,584,675

[45] Date of Patent: Apr. 22, 1986

[54] ELECTRICAL MEASURING WHILE DRILLING WITH COMPOSITE ELECTRODES

[76] Inventor: James M. Peppers, 1026 Plover La., Arlington, Tex. 76015

[21] Appl. No.: 278,045

[22] Filed: Jun. 29, 1981

Related U.S. Application Data

[63] Continuation-in-part of Ser. No. 269,427, Jun. 1, 1981.

[51] Int. Cl.[4] .......................... G01V 1/40; G01V 3/02
[52] U.S. Cl. ..................... 367/81; 324/375; 340/853; 340/856
[58] Field of Search .................. 367/81, 82, 83, 84; 340/853, 856, 854, 861; 324/369, 373, 356, 375, 323

[56] References Cited

U.S. PATENT DOCUMENTS

| | | | |
|---|---|---|---|
| 3,462,679 | 8/1969 | Attadi | 324/375 |
| 3,831,138 | 8/1974 | Rammner | 367/81 |
| 3,889,228 | 6/1975 | Shawhan | 367/82 |
| 4,015,234 | 3/1977 | Krebs | 367/81 |
| 4,057,781 | 11/1977 | Scherbatskoy | 340/853 |
| 4,087,740 | 5/1978 | Suau | 324/373 |
| 4,087,781 | 5/1978 | Grossi et al. | 340/854 |
| 4,181,014 | 1/1980 | Zuvela et al. | 340/856 |

OTHER PUBLICATIONS

"Second Generation MWD Tool, " *Oil and Gas Journal,* Feb. 21, 1983, pp. 84–90.
"Borehole Telemetry System is Key to Continuous Down-hole Drilling Measurements," *Oil and Gas Journal* Sep. 15, 1975, pp. 111–118.

*Primary Examiner*—Nelson Moskowitz
*Assistant Examiner*—Ian J. Lobo
*Attorney, Agent, or Firm*—James E. Bradley

[57] ABSTRACT

Discloses a two-way telemetry system and method for transmitting data taken at the bottom of a well bore to the earth's surface with one part of the telemetry circuit being the metallic drilling string and with another part of the telemetry circuit being a large volume of the earth formation surrounding the well bore between the drill bit and the earth's surface. Basic method includes the steps of generating electrical power within the drill pipe responsive to fluids pumped through the drill pipe, generating intermittant bursts of a first voltage representing a digital signal with the repitition function of the digital signal being regulated by a measured parameter, passing a first "focussed" current impressed by the first voltage from a first "composite" electrode radially outward and laterally away from the well bore to form one path of the current being the drill pipe, and receiving and detecting such first voltage potential resulting from the first Ac current with a receiver/detection means connected to the drill pipe and to a receiver electrode located remote from the drilling string and electrically connected into the earth formation. A control signal may be impressed in reverse order through the respective successive electrodes to be received at the bottom of the bore to switch and/or calibrate apparatus located at the bottom.

16 Claims, 5 Drawing Figures

ELECTRICAL MEASURING WHILE DRILLING WITH COMPOSITE ELECTRODES

This application is a continuation-in-part of U.S. application Ser. No. 269,427, filed June 1, 1981.

This invention generally pertains to logging within well bores drilled into earth formations and more particularly pertains to telemetry apparatus and method for measuring while drilling with a portion of the apparatus being component parts of a drilling string.

BACKGROUND OF THE INVENTION

Many approaches have been taken to measuring while drilling or logging while drilling. Most approaches have utilized pulsing or vibrating the drilling mud column within the drill pipe for signal transmission.

Any approach utilizing pulses impressed on the mud column is subject to the dampening or attenuating characteristics of the drilling mud such as viscosity, compressibility, density, temperature, entrained air, entrained solids, all of which may serve to some extent to dampen a pulsed or cyclic pressure change within the mud.

One known approach to transmitting signals from the well bore bottom to the earth's surface electrically is disclosed in U.S. Pat. No. 4,057,781. This U.S. Pat. No. 4,057,781, which discloses a system herein referred to as the "cascade" communication system, is herein specifically incorporated by reference for its background information.

The cascade system also involves the method of logging while drilling a well bore.

The attenuating qualities of drilling mud in drill pipe are such that it is postulated that no mud signal will be recoverable at the earth's surface at depth in excess of probably 12-16,000 feet although it has been reported that usable signals have been recovered from depths as great as 12,000 feet.

Also a problem with subsurface telemetry has been that, in large part, batteries are required to operate the detection and transmission circuitry at the bottom of the well bore and also for relaying intermittant signals from places along the drilling string such as in the cascade system above referenced. Batteries are prone to become much less efficient and finally inoperative at temperatures in excess of about 300° F. and, at present, no batteries are commercially available which are operable for any appreciable length of time in some hot, deep wells.

While the cascade system appears somewhat similar to the present invention, such similarity will be seen to be superficial after further examination of the present apparatus and method.

The present invention utilizes the conductive properties of large volumes of the earth formation surrounding the well bore in a manner somewhat similar to wireline open hole electrical logging which may be referred to as "focussed current" logging, or, from another perspective, as "single electrode" logging.

OBJECTS OF THE INVENTION

An object of the present invention is to provide a signal at the earth's surface corresponding with high fidelity to a signal produced from the detection apparatus at the bottom of the well bore and at any depth in the well bore from just below the surface pipe to the greatest depth presently attained by the current state-of-the-art drilling apparatus.

Another object of the invention is to provide means whereby signals at the earth's surface may be transmitted in reverse order down through the earth formation back to the detection apparatus for purposes of switching the apparatus and/or remotely calibrating the apparatus as desired.

Still another object of the present invention is to provide a telemetry system which may be included in the usual drilling string with no required modification of the drill string anywhere from the drill collars to the rotary table with exception only of the subs in the drill collars containing the detection and transmission apparatus and the signal relay station subs spaced at designated intervals along the drill pipe with each relay station requiring no more length than 1 to 3 normal joints of drill pipe or about 30 to 90 feet.

Yet another object of the present invention is to eliminate the various valves, linkages, seals, solonoids, and the like which are inherent in systems which mechanically pulse or vibrate the drilling mud column as a signal function.

A further object of the invention is to pass electrical current radially out into the surrounding subsurface earth formation by "focussing" a portion of the total electrical current passing through a "composite" electrode with other portions of such total current being gradually shunted to along the drill pipe which serves as a common conductor in the signalling system.

Another object of the invention is to provide means to evenly distribute electrical current flow along the length of a composite electrode for passage through the surrounding earth formation so that a substantially uniform electrical current is passing through the drilling fluid, invaded earth formation, and original earth formation surrounding a well bore throughout the length of the composite electrode.

SUMMARY OF THE INVENTION

The foregoing and other objects and advantages are attained in a telemetry system and method for transmitting data taken at the bottom of a well bore near the drill bit to the earth's surface with one part of the telemetry circuit being the metallic drilling string and with another part of the telemetry circuit being a large volume of the earth formation surrounding the well bore between the drill bit and the earth's surface.

The basic method includes the steps of generating electrical power within the drill pipe responsive to fluids pumped through the drill pipe, generating intermittant bursts of a first AC voltage representing a digital signal with the repitition function of the digital signal being regulated by a measured parameter occurring near the drill bit, directing a first "focussed" AC current impressed by the first AC voltage from a first "composite" electrode radially outward and laterally away from the well bore to form one path of current flow through the surrounding earth formation with the common path of such current being the drill pipe, and receiving and detecting a first voltage potential resulting from such first current with a surface located receiver/detection means connected to the drill pipe and to a receiver electrode located remote from the drilling string and electrically connected into the earth formation.

The method further may include detecting such first AC voltage with detection means connected to the drilling string and to a second electrode located remotely from the first electrode and exposed to the earth formation, generating intermittant bursts of a second AC voltage of frequency different from such first AC voltage and with use of separate electrical power and regulated by the repitition function of such first AC voltage to be of the same repitition function as such first AC voltage, directing a second focussed AC current impressed by the second AC voltage outwardly radially through the surrounding earth formation to form a path of such second AC current through such earth formation with the common path of such second AC current being the drill pipe, and receiving and detecting the second AC voltage potential resulting from said first AC current through detection electrodes into such receiver detection means as above.

Apparatus suitable for use in performing the steps of the method is disclosed.

A control signal may be impressed in reverse order through the respective electrodes as above described to be received at the bottom of the well bore and processed to switch and/or calibrate apparatus located at the bottom.

DESCRIPTION OF A PREFERRED EMBODIMENT

Figures 1, 2, 3, 4, 5:
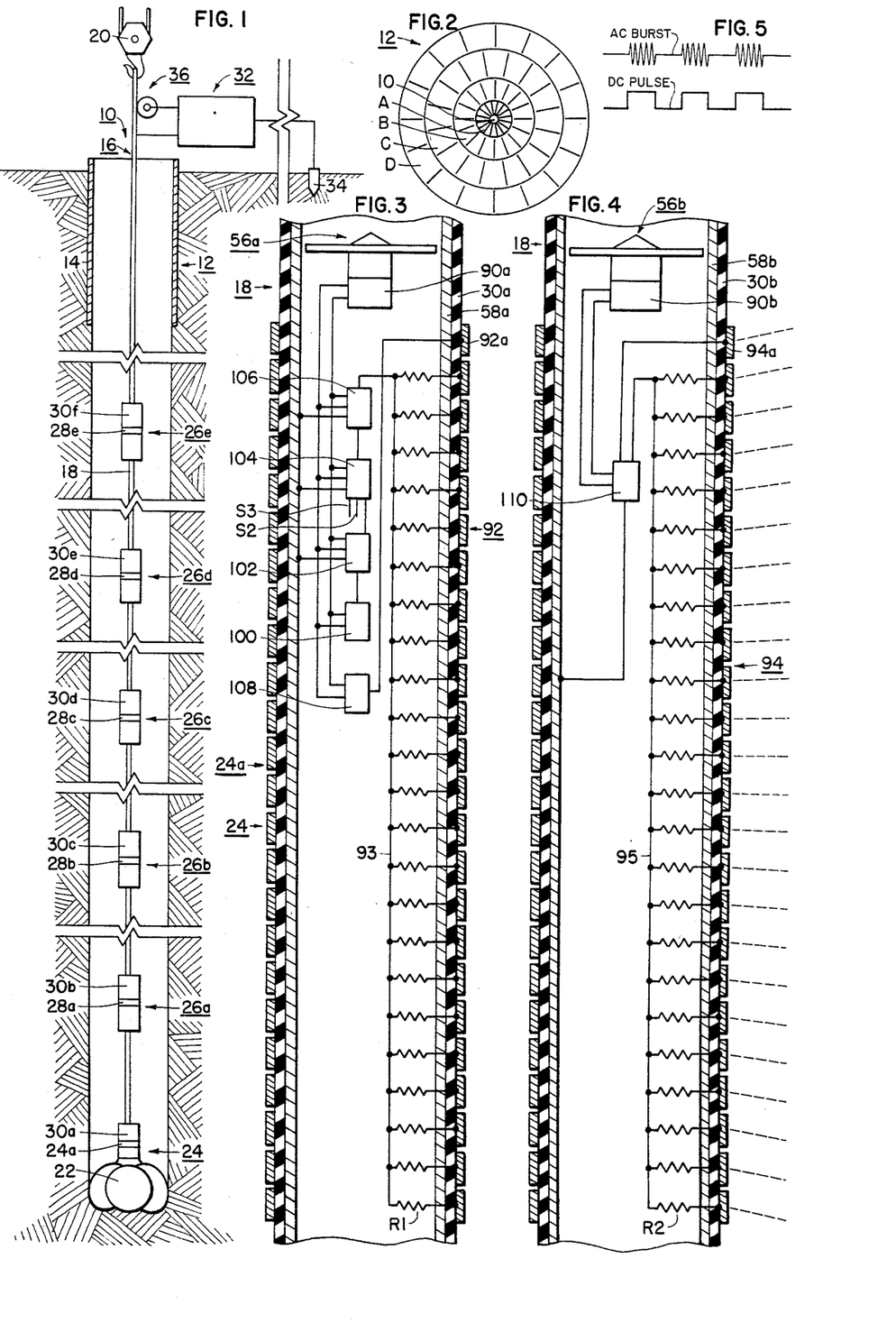
FIG. 1 is a schematic illustration of the present invention as incorporated in a drill string between a drill bit at the bottom of a well bore and the traveling block hook of a drilling rig at the earth's surface.
FIG. 2 is an illustrative and typical horizontal cross-sectional view of the earth formation surrounding the drilling string and well bore at each of the current electrodes shown in FIG. 1.
FIG. 3 is a schematic representation of the detection and transmission portion of the present invention as will be mounted immediately above the drilling bit shown in FIG. 1.
FIG. 4 is a schematic typical representation of the various signal relay stations shown in FIG. 1 with each signal relay having its own power generator and signal receiving and transmitting system as shown.
FIG. 5 is a curve illustrating a typical DC digital signal compared corresponding bursts of AC current as described in the specification.

Referring now to FIG. 1, there is shown a well bore 10 drilled into an earth formation 12 and filled with a drilling fluid or mud of some known electrical resistivity. The upper portion of the well bore 10 has installed therein a length of surface pipe 14 which may extend into the bore a distance of from 300-1,000 feet, for example. Located in operating position within the well bore 10 is a drilling string 16 which includes many lengths of drill pipe 18 extending from rotary drilling apparatus (not shown) including a rotary table, mud pumps, mud pit and a travel block 20.

At the bottom of the well bore 10 is situated a rotary drill bit assembly 22 which includes the bit and a varied number of drill collars for stabilizing the bit and providing weight on the bit.

Mounted as part of the drill collar of the bit assembly 22, or immediately above the drill collars, is a detection and transmission station 24, which is better shown in FIG. 3. Mounted above the detection station 24 along the length of the drilling string 16 and connected together by many lengths of drill pipe 18 may be one or more signal relay stations illustrated as 26a, 26b, 26c, 26d, 26e, etc. A typical illustration of such relay stations 26a–26e is better illustrated in FIG. 4.

Schematically illustrated about midway of each of the transmission station 24 and the signal relay stations 26a–26e is a focussing receiver/transmitter composite electrode identified in FIG. 1 as 24a beginning with the detection station 24 and as 28a–28e through each of the signal relay stations 26a–26e as shown.

The composite electrodes 24a and 28a–28e are seen to include, in order to be electrically isolated from the ends of the resepctive stations, insulation sheaths or jackets 30a–30f which surround the metallic portion of the drill string 16 to insulate the electrode appearing outside in electrical connection with the earth formation 12 from the metal of the drill pipe of the drilling string. These jackets, illustrated as 30a through 30f in FIG. 1, may be provided of abrasion resistant rubber, such as used in truck tires or inflatable well bore packers, or may provided of a laminate of fiberglass which has been used to insulate similar mandrils in the prior art. A typical insulating jacket 30 is better shown in FIGS. 3 and 4.

At the top of the drilling string 16 at the earth's surface, a receiver/processor unit 32 is provided with connection to the drilling string 16 as shown and to a receiver electrode 34 as shown. As later described, the receiver electrode 34 will generally be mounted with good electrical connection established into the earth formation 12 at a position spaced apart from the metal parts of the drilling rig and drilling string at distances of from 100–1,000 feet or more, for example.

A depth measurement device 36 is schematically shown in connection from the receiver 32 to the drilling string 16 to provide an indication of depth measurement into the receiver. Other devices (not shown) such as torque measurement, drilling weight on the bit, mud weight, and the like may also be provided as desired. The appropriate system within the receiver/processor 34 may be any of those commercially available as needed to process the signals brought into the receiver from both downhole and the drilling floor.

As seen in FIGS. 3 and 4, there is shown a typical power generator 56 mounted within a section of pipe 58. The power generators are shown in FIG. 3 as generator 56a and in FIG. 4 as generator 56b respectively housed within pipe 58a and 58b as shown. Generators 56a and 56b generally comprise an impeller section 60 which may or may not have straightening vanes.

The power supply systems, shown respectively as 90a and 90b in FIGS. 3 and 4, may be conventional and comprised of appropriate transformers, rectifiers, and capacitors in connection to produce steady flow direct current of one or more values as needed during all the time that the generator assemblies shown as 56a and 56b are being rotated by the high pressure drilling mud.

Referring now to FIG. 3, the detector transmission station 24 is seen to have mounted about the outside of the insulating jacket 30a a sensor/transmitter composite electrode 92. Shown in FIG. 4 outside the insulating jacket 30b is a similarly functioning receiver/transmitter composite electrode 94.

The electrodes 92 and 94 are termed "composite", electrodes in this specification and also in some of the appended claims.

In FIG. 3, the power supply 90a is seen to supply power voltage as required to a sensing element 100, an analog to digital (A/D) converter 102, a multiplexing (MX) system 104, a digital to frequency converter (D/f) transmitter 106, and a receiver element 108.

The sensing element 100 may be a system including a thermocouple, a radioactivity detector, a torque measurement circuit, an inclination/azimuth system, or such other detection units as may be chosen for use with the present invention.

The output of the sensing element 100 normally may be a DC analog signal which is passed into the A/D converter 102 where it is converted and transmitted out as a binary digital pulse signal, for example, with a pulse repitition rate and pulse duration as best suited for the system as later described.

The digital output from A/D converter 102 is passed into multiplex (MX) system 104 along with possible signals from other sensing elements through the connectors $S_2$ and $S_3$, for example. In the event that the sensing element 100 is the only sensing element in use, then the MX system may be bipassed or eliminated.

The output from the MX system 104, which may include the output of A/D converter 102 along with similar converters from other sensing elements, is passed into the D/f converter and transmitter 106.

In converter 106, the digital input is transformed into an output which are a series of bursts of AC current of designated frequency with each burst being in phase and synchronism with a corresponding digital pulse received from A/D converter 102. The output of the D/f converter 106 is passed out of the electrode 92 into the surrounding earth formation as shown in FIGS. 2 and 4. The voltage from D/f converter 102 and the current eminating through electrode 92 may be of focussed character represented by the AC burst in FIG. 5. While an amplified DC binary digital pulse could be used in lieu of the converted D/f signal as shown in FIG. 5, it will become apparent that use of a DC signal may be limited and is recommended only when its use is obviously suitable.

The function of the receiver element 108, which is connected to a sensing electrode 92a, will be described later in connection with another function of the system.

In FIG. 4, there is shown a receiver/transmitter 110 connected to a receiver electrode 94a and to the transmitter composite electrode 94. The receiver 110 is supplied with power from the power supply 90b.

In operation, the receiver transmitter 110 receives bursts of AC voltage at receiver electrode 94a, at frequency $F_1$ for example, and transmits a signal back out through the composite electrode 94 at a frequency of $F_2$, for example, with each burst corresponding in phase and duration to the AC bursts received at frequency $F_1$.

The receiver electrodes 92a and 94a are separated from the respective composite electrode 92 and 94 and individually connected into receiver element 108 and receiver/transmitter 110, respectively, to reduce possible electrical interference and to bypass the attenuating effects of the resistors R1 and R2, since signals received at these electrodes are expected to be at a very low level.

The dashed lines in FIG. 4 illustrate generally the radial path of the current through both composite electrodes 92 and 94, generally identified as a "focussed" current which is guided or focussed on its either side by another portion of the current, as later explained.

As will be later explained in more detail, FIG. 2 generally shows the horizontal pattern of the focussed current as it passes in radial fashion away from the well bore 10.

As previously mentioned, the output of the D/f converter 106 may be of a frequency $F_1$ and the output of the receiver/transmitter 110 may be of a frequency $F_2$.

Referring to FIG. 1, the $F_1$ frequency which eminates through the electrodes 24a is the frequency of the current in the earth formation 12 between the electrode 24a and the electrode 28a and the current passing between the electrodes 28a and 28b is of frequency $F_2$ as generated by transmitter 110. It is seen further that the current passing between the electrodes 28d and 28e, the electrodes 28c and 28d, the electrodes 28e and 28e and the electrodes 28e and the receiver electrode 34 may of alternate frequencies $F_1$ and $F_2$.

The reason for these two frequencies is that the frequency $F_1$ of the current between electrodes 24a and 28a will be of sufficient magnitude to permit detection of a potential at the electrode 28a but not sufficient to produce a measurable potential between the electrode 24a and electrode 28b. If the signal $F_1$ were of sufficient magnitude to be measured at electrode 28b, then the signal relay station 26a would be unnecessary. The spacing between the signal relay stations is such that the voltage of a given frequency will pass current through the earth formation between the electrodes and the stations are to be spaced apart along the drilling string the maximum distance that potential may be measured.

In the absence of visualizing the present system from the viewpoint of measuring small potentials such as generated by the currents provided in the electrical prospecting or logging arts, one would surmise that the current from the composite electrode 92 would immediately complete its circuit by shunting directly to the drill string 16 just above the transmission station 24. Of course some such current through electrode 94 is shunted through the drilling mud and immediate formation to the drill string 16, but not all of such current.

The composite electrode 92 as shown includes a section of the drill string 16 (including pipe 58a) insulated by the insulating jacket 30a which may be the length of one, two or possibly three sections or joints of the drill pipe 18, or about 30 feet, 60 feet or possibly 90 feet, for example.

The electrode array of electrode 92 is comprised of a plurality of individual electrodes mounted along the jacket 30a at substantially the center of the jacket. The individual electrodes are connected to a bus or trunk conductor 93 through a respective resistor R1 for each respective electrode as shown. The bus conductor 93 is powered by the output of D/f converter 102 as previously described.

The purpose of the resistors R1 is to distribute the electrical current flowing through the individual electrodes in a designated manner, herein exemplified as being an equal amount of electrical current through each individual electrode in the electrode array. The purpose of such an arrangement is to control the current flow to be equal through the length of the electrode array. Thus, the current flow through each respective electrode (excepting the electrodes at the ends of the array) is guided or "focussed" by equal electrical currents passing through the adjacent electrodes which straddle such electrode. Such focussing action guides the current passing from the center of the electrode away from composite electrode 92 the fartherest distance radially away from the well as later descirbed with reference to FIG. 2.

The resistors R1 of the composite electrode 92 may be of relatively low value so long as the electrical resistance of the resistors is greater than any electrical resistance encountered outside the individual electrodes.

The composite relay electrode 94 with its bus conductor 95 and resistors R2 has the same structure and function as the composite electrode 92.

The composite electrodes 92 and 94, respectively, may include as few as three individual electrodes in the composite electrode or more than 50 individual electrodes in the composite electrode, as examples. Also, the effective length of the composite electrodes 92 and 94, along the length of the insulating jacket 30, may be as short as one foot to more than ten feet. The geometry of the composite electrode as disposed in the well bore and in electrical communication with the conductive drilling mud and the surrounding earth formation should be such that the guarded or focussed center portion of the electrical current should eminate radially directly away from the well bore without distortion for a considerable distance and with substantial uniformity as provided by the current distribution of the composite electrode.

It is noted that a degree of current focussing will occur if each of the electrodes 92 and 94 is an elongated unitary member of appreciable length. Assuming that the current passes out of an elongated conductive member uniformly, then the outer portions of the current flow will serve to focus the central portions of the current radially and outwardly. However, if the surface or skin resistivity of the electrode is varied, or if resistivity of the adjacent strata or layers of earth formation varies, then the current will obviously pass through the path of least resistance and not be truly focussed as will be required by structure of the composite electrode. Thus, the system is always provided with a focussed signal current with the composite electrode. Such signal current may be less focussed with an integral electrode, depending on its skin resistivity and the varied earth formation.

In the actual manufacture of the composite electrode 92 and 94, the sheath or jacket 30a will extend substantially the full length of the pipe 58a (which comprises part of the drilling string 16) and the electrode array will be desirably installed about midway of the insulating jacket 30a. The individual electrodes of the electrode array will be preferably imbedded within the jacket 30a such as to be flush with the outside diameter of the jacket. The pipe 58a, including the additional diameter of the jacket 30a and electrode 92, will be no greater than the outside diameter of the drill collars of the drilling string 16 and preferably should be of a minimum outside diameter as would result when jacket 30a and the individual electrodes of the composite electrode are built up about a joint of drill pipe 18. In such event, the electrical instrumentation then would be linearly placed apart at the bottom or top of the composite electrode in a section perhaps as large as a section of drill collar which will give space for the instrumentation and a measure of rigidity such as afforded by a drill collar. The composite electrode 94 is of the same construction as the electrode 92.

On either side of the composite electrode, a number of spaced apart abrasion resistant collars (not shown) may be installed about the jacket 30 and, if provided of steel, insulated from the pipe 58. Such collars will protect the jacket 30 from abrasion with the well bore wall during the rotation of the drill string 16. Since such abrasion protective collars would have no electrical contact with the pipe 58 and the drill string 16, other than some conductive connection through the drilling mud found in the well bore, the presence of such conductive protective collars would not be detrimental to the operation of the invention.

While the sheath 30 may be provided of abrasion resistant material such as rubber or fiberglass, the abrasion resistance is far less than the abrasion resistance of steel such as normally found in drill collars, drill pipe, and the tool joints of drill pipe. Consequently, the portions of the drill string 16 which include the pipe 58 and the insulating jacket 30 should be carefully centralized away from contact with the well bore wall inasfar as feasible.

Experimentation with abrasion resistant elements such as provided of porcelain and ceramic products may disclose a material having longer life than presently known.

Referring now to FIGS. 1, 2 and 4 the evenly distributed current is focussed through a composite electrode laterally and radially away from the axis of the well bore by the tendency of the current to radiate outwardly from the well bore in an initially horizontal manner through the drilling mud and surrounding earth formation somewhat as illustrated.

However, when the current is displaced farther from the well bore, the greater the volume of earth formation, or in FIG. 2 the greater the area of formation, is available for current flow.

It is important to note that the portion of the electrical current which is radially directed or focussed to some distance away from the bore hole thereafter encounters less effective resistance than would be encountered if returning to the drilling string 16. This inherent physical characteristic is the basis from which the present invention is structured.

For purposes of illustration only, FIG. 2 as shown may be divided into zones A, B, C, and D of increasing annular area. Assuming the formation 12 as shown in FIG. 2 to be of disc shape of constant thickness and constant resistivity, it is readily seen that the resistivity of the volume of zone A would provide a given resistance to a designated flow of electrical current. As can be seen, the zone B is of much greater volume for the same current flow with corresponding less effective electrical resistance. In turn, zone C is of yet much greater volume and corresponding lesser effective resistance to current flow than zone B, and zone D, and on out, becomes far greater in volume with far less effective resistance to the same current flow.

In the zones A–D and beyond, the formation volume available for current passage increases as a function of the radius squared on a plane and as to the radius cubed in a sphere.

Thus, after current is laterally focussed through zone A and zone B, for example, there is little or no effective resistance to that specific amount of current flow in the much larger volumes beyond. Such effective decrease in resistivity with increase in distance would appear to follow the equation of decrease in light intensity from a given source, or, the concept of an increasing number of resistors connected in parallel for each incremental zone of greater radius.

Thus it is seen that the *effective* resistance to current flow, once the current has passed to a distance away from the well bore, is exceedingly small and becomes smaller as the volume of earth formation increases for the same current to pass through.

Conversely, current coming back to pass through the zone immediately around the well bore to a particular point such as the electrode 94, or any point along the drill string 16 between the electrodes 92 and 94, meets with increasing affective resistance as the current comes toward the well bore.

Very little current is required to produce a measurable potential at electrode 94, for example, while a very good shunting conductor path would be required to completely shunt *all* the initial current flowing between the composite electrode 92 and composite electrode 94, or between electrodes 28a and 28b, for example, such as to eliminate a measurable potential.

Thus, it is seen that sufficient electrical current will pass through the earth formation to be available at the succeeding electrode to produce a measurable potential even though some, or even most, of the current may be shunted to the drill string along its length.

Of course a great number of variables exist in the present array of apparatus as disclosed. The conductivity of the steel along the drill string 16 may be assumed to be relatively constant.

Of significant importance, the conductivity of the drilling mud in the well bore between the well bore annulus between the well bore walls and the drilling string may vary considerably depending on the nature of the mud. If the mud is of moderate to fairly high resistivity, then the system will work very well. If the mud is of extreme low resistivity, such as with a high salt mud, then the conductivity may severely curtail the distance that the measurable potential can be measured and thereby reduce the distance between any of the electrode stations 26 shown in FIG. 1. If the drilling mud is highly resistive, such as with an oil base mud, then there may be considerable difficulty unless enough current can pass through the mud to expand out into the formation as previously described.

The varied resistivity of different stratum of the earth formations, particularly at any appreciable distance from the well bore, is not considered to be a very substantial factor in the signal transmission of the present invention.

All the previously mentioned variables may be brought into much better perspective with employment, in a test well, of various drilling fluids, spacing of relay stations, signal current output from relay stations, surface electrodes, and the like to obtain reliable data.

OPERATION OF THE PREFERRED EMBODIMENT

In operation, the drilling string 16 is made up including the components of the present invention and run into the well bore 10 as shown. The mud pumps may then be started to force drilling mud down through the drilling string 16 at high pressure and high volume, utilizing up to several hundred horsepower in pumping, for example.

The transmission system, as herein provided, is operable at all times that the drill string 16 is being rotated and the mud pumps are rotating the generators 56, though some sensing elements at the sensing station 100 may require that rotation be stopped when measurements are being made. At the minimum, the telemetry system will function with drilling stopped and with the mud being circulated in volume only sufficient to rotate the generators 56.

The generators 56, as mounted within the signal relay stations 26a–26e and the detector transmission station 24, are operating at all times that mud is being pumped through the well bore and are producing electrical power.

The electronic circuitry of the signal relay stations 26a–26e may be adapted to respond and produce a signal voltage only when a signal voltage is received from a preceeding station. The transmission station may be switched off and on to send signals, if such is desirable, as later described.

As the bit is rotating to drill additional depth in the well bore 10, each sensing element 100 may produce a DC signal which is converted to a binary digital signal by the A/D converter 102 and fed into the MX system 104, or directly into the D/f converter 106, as appropriate. The D/f converter converts the binary digital signal into corresponding bursts of alternating AC voltage of frequency $F_1$ which is passed as an AC current through the electrode 92 out into the earth formation.

The relay station 26a is spaced appropriately for detector/transmitter 110 to detect the alternating potential of frequency $F_1$ and convert it into bursts of amplified voltage of frequency $F_2$ which is passed out through the electrode 94. The spacing between the transmission station 24 and the relay station 26 will of course vary with the many variables previously mentioned.

The frequency of the $F_1$ is one factor. The conductivity of the drilling mud is another factor. The conductivity of all the surrounding formation and the mud filtrate encroached section of formation is a factor. The surface resistivity of the drill pipe of the intermediate part of the drilling string is yet another factor. All of these contribute to the variables which will need be assessed to make a general arrangement that will be useful in wells with a given drilling mud resistivity.

An increased surface resistivity of the drilling string is helpful to reduce power requirements and to reduce the necessary length of each jacket 30. Any kind of a coating on the drilling string is helpful, such as mill varnish, paint, or the like.

The system herein disclosed would operate ideally with more modest power requirements if the entire length of the drill string 16 were completely insulated, as by a plastic paint coating. However, if the plastic coating were initially provided, it would be worn off at the drill joints as well as being cut, scraped and nicked, to leave bare and conductive surfaces on the pipe, during its handling in being made up and broken out during the many trips in and out of the well bore during the drilling operation.

The system of the present invention will be functional as a practical matter, however, with little or no surface insulation on the drill string 16, provided that sufficient power is made available and provided that the effects of the focussed current is known to permit proper spacing of signal relay stations as may be required. The fact that tool joints throughout the drilling string are kept rubbed free of paint and/or any other type of coating is not particularly detrimental to the use of the present invention.

It is also pointed out that, if the transmission station 24 is located not too far below the surface pipe 12 (at the location of relay station 26e, for example) then no intermediate signal relay station 26 is actually necessary.

The receiver/processor system 32 at the earth's surface actually receives its signal from the receiver electrode 34 through the earth formation 12 with the drill pipe serving as the common conductor through the system. Thus, the current at frequency F₁ is passed through the formation 12 transmission station 24 to form a potential between the transmitter electrode 24a and the receiver electrode 34 (in the absence of any relay station 26). This arrangement is the broadest aspect of the present invention.

As the hole is drilled deeper into the earth, additional signal relay stations 26 are added as may be needed. Each relay station may produce a signal of frequency different than its successor and also its follower. Of course the receiver/processor system 32 would need be switched to receive alternate frequencies $F_1$ and $F_2$ with the addition of each additional signal relay stations.

In the fabrication of the present invention, it is anticipated that each relay station 26 will be of length primarily established by the necessary or desirable length of the insulating jacket 30. Exemplary lengths could be a distance of 15-30 feet on either side of the electrode array which would amount to about 30-60 feet or the length of one or two joints of drill pipe or approximately 90 feet long which would give a better isolating affect for the action of the current electrodes 92 and 94, as previously described.

It is also suggested that the spacing between the transmitter station 24 and the first relay station 26a (or between the relay stations 26) be great enough that no more than an adequately measurable potential can be produced at the appropriate sensing electrode. Should this potential be high enough to co-mingle with the next potential along the drilling string of same frequency, then the stations may have their detection sensitivity levels adjusted accordingly or be spaced farther apart.

The principle reason that two frequencies are recommended rather than relaying the same frequency from station to station is that possible distortion in phase relation of the voltage frequencies or time relation of the digital pulse signal, or interference with the measured signal, may occur which would be undesirable. While the same frequency may be workable, the alternate frequencies are herein recommended to avoid any such distortion or complication.

Now, with the foregoing construction and operation explained, it is to be noted that signals may be transmitted down the hole from the earth's surface as well as up the hole from the sensing instrument, as previously described, with appropriate circuit provisions.

In such instance, a transmitter would be provided to provide a signal through the receiver electrode 34 of appropriate frequency which may be picked up by the first relay station and transmitted successively down as described, through the various relay stations to the detector transmitter station 24. There, as shown in FIG. 3, such frequency may be received at electrode 92a and transmitted into the receiver 108, previously identified, and thereon converted into a DC pulse signal or analog signal as desired to affect switching, as may be needed in the downhole instrument, or to effect calibration of a particular downhole instrument as presently performed in wireline logging tools of similar or equivalent nature. Reference to the wireline well logging art will provide additional information regarding this switching facility.

It is to be noted that the invention as herein described depends on an ample continuous and dependable power supply at the sensor/transmitter station 24 and each of the signal relay stations 26 to be operable and successful. Accordingly, the provision of a reliable power supply, such as the mud turbine power supply previously described, is of paramount importance. No known battery or batteries, are capable of providing such power while being packaged within the drilling string 16 or while operating at the high temperatures sometimes encountered.

In summary, the most simple version of the present invention includes the drill string 16 as a common return conductor, the signal transmitter 106 connected to the drill string and through the transmitter electrode 92, the earth formation 12 to the receiver electrode 34, and the receiver 32 connected between the drill string and the receiver electrode to complete the circuit. The signal potential variation is transmitted through earth formation 12 with the drill string serving as a common electrical return. The signal current path through the formation is considered to be radially away from the composite electrode 92 for some distance, then up through earth formation 12 to receiver electrode 34.

At well depths where the received signal of the above described version becomes too attenuated to have integrity, one or more signal relay stations 26 are used as necessary.

With one relay station 26 employed, there are two signals transmitted through earth formation 12 with drilling string 16 serving as a common return. The signal from transmitter 24 is transmitted through earth formation 12 to receiver/transmitter 26a at electrode 94a, which then transmits a second signal through composite electrode 94 to the receiver electrode 34. In the versions using one or more signal relay stations, the signal may be digital bursts of AC voltage of designated frequency for each signal.

It has become apparent that the following factors are of substantial importance in the successful operation of the present invention:

(1) The power source or sources as provided for the system need to be sufficiently ample to provide the current as herein described;

(2) The insulating shields 30 provided at each transmitter or receiver electrode on the drill string 16 are necessary to allow direction or focussing of the current flow and to reduce the amount of current needed;

(3) The current focussing action as herein described with respect to composite electrodes 92 and 94 is highly desirable;

(4) The current passing through the composite transmitter electrodes, such as electrodes 92 and 94, may be set at a designated level for stable operation and to permit better forcasting of the spacing needs between the transmitter 24 and relay stations 26 or the transmitter 24 and the surface receiver electrode 34;

(5) The receiver electrode 34 should be spaced sufficiently apart from the drilling string 16 at the earth's surface to minimize any interference or noise as may be caused by the various interacting metal parts of the drilling equipment and surface pipe 14.

In summary, it is seen that a new and novel arrangement is herein shown and described which will transmit signals of integrity from any depth in the well where temperatures will permit operation of presently available electronic components and at greater temperatures than where batteries can be functional.

Further, there is no wear and tear of mechanical components as found in a mud pulse system. The wear in the present system is confined only to the blades of the generator impellers. Since no great power is transmitted by these impellers as with turbine drilling impellers, the wear on the impellers will not be near as great, and, even if the wear is considerable, they can be replaced conveniently at any time that the drilling string is withdrawn from the hole.

It is to be noted that the term "composite" electrode, as used in this specification and in the appended claims, shall be construed to means the combination comprising: (1) at least three spaced apart current electrodes disposed along the length of a pipe which is adapted to be included in a drilling string; (2) an electrically insulating jacket disposed to insulate the current electrodes from the pipe and from a drilling string for a designated distance along the pipe away from the current electrodes; (3) electrical current limiters, such as resistors, respectively connected between each of the current electrodes and a common electrical bus means; and (4) with each of such resistors being of value designated to provide a respective current to its respective current electrode such that all the current electrodes may transmit equal electrical currents.

It will be evident that various refinements to the present embodiment as disclosed will become obvious to one skilled in the art, and that various modifications and refinements can be made to the present embodiment as disclosed, all without departing from the spirit of the invention as outlined in the following claims.

I claim:

1. Apparatus for transmitting data taken at the bottom of a well bore near the drill bit to the earth's surface with one part of said apparatus being the metallic drilling string (16) and with another part of said telemetry apparatus being a large volume of the earth formation surrounding the well bore between the drill bit and the earth's surface, the combination comprising:
   (a) subsurface detection means (100, 102, 106) for generating sequential bursts of a first AC voltage in a digital sequence to form a digital information signal representative of a measured parameter near said drill bit;
   (b) subsurface transmitt means (106) including a first electrode means (92) for passing a first AC signal current impressed by said first AC signal voltage to be focudsed from said first electrode outwardly and laterally away from the well bore to form one path of initially horizontal current flow radially out through the drilling fluid and surrounding earth formation (12) with the common path of said first AC signal current being said drill pipe;
   (c) first substrate electrical power means (90) for providing electrical power to said detector means and said transmitter means; and
   (d) surface receiver means (32) connected to said drill pipe and a receiver electrode (34) located remote from the drilling string and electrically connected into the earth formation for detecting a first AC signal potential voltage resulting from said first AC signal current.

2. The apparatus of claim 1 wherein said electrical power means is an electrical generator means (56, 90) powered by flow of drilling fluids through said drilling string.

3. The apparatus of claim 1 wherein said transmitter means includes multiplex means (104) to alternately switch said detection means and at least one other detection means into connection with said transmitter means.

4. The apparatus of claim 1 wherein said first electrode is a composite electrode comprising:
   (a) at least three spaced apart current electrodes disposed along the length of a pipe (58) adapted to be included within a drilling string (16);
   (b) an electrically insulafing jacket means (30a) disposed to insulate said current electrodes from said pipe and said drilling string for a designated distance along the side of said pipe away from said current electrodes;
   (c) electrical resistor means ($R_1$) respectively connected between each said current electrode and a common electrical bus means (93);
   (d) electrical current source (106) means connected to said bus means; and
   (e) each of said resistor means being adapted to provide a respective current to its respective electrode such that all the current electrodes may direct electrical currents equal in value.

5. The apparatus of claim 1 further comprising:
   (a) second detection means (110) connected to the drilling string and to a second electrode means (94a) located remotely from said first electrode means and exposed to the earth formation (12) through the drilling fluid for detecting an AC signal potential from said first signal current;
   (b) second transmitter means (110) for generating sequential bursts of a second AC signal voltage of frequency different from said first AC signal voltage and regulated by said first AC signal voltage to be of the same representative character as said first AC signal voltage;
   (c) third electrode means (94) for directing a second AC signal current impressed by said second AC voltage outwardly to be focussed radially through the surrounding earth formation to form an initially horizontal path of said second signal current through such drilling fluid and earth formation with the common path of said second signal current being said drill pipe;
   (d) second electrical power means (56b, 90b) for providing electrical power to said second detector means and said second transmitter means; and
   (e) said receiver detection means receiving and detecting said second signal potential resulting from said second signal current.

6. The apparatus of claim 5 wherein said first electrode means (92) and said third electrode means (94) are composite electrodes comprising:
   (a) at least three spaced apart current electrodes disposed along the length of a pipe (58a, 58b) adapted to be included within a drilling string;
   (b) an electrically insulating jacket means (300, 306) disposed to insulate said current electrodes from said pipe and said drilling string for a designated distance along the side of said pipe away from said current electrodes;
   (c) electrical resistor means ($R_1$, $R_2$) respectively connected between each said current electrode and a common electrical bus means (93, 95);
   (d) electrical current source means (106, 110) connected to said bus means; and
   (e) each of said resistor means being adapted to provide a respective current to its respective electrode such that all the current electrodes may direct electrical currents equal in value.

7. The apparatus of claim 1 further comprising means for impressing in reverse order said signal through the said respective electrodes to be received at the bottom of the well bore and processed to switch and/or calibrate apparatus.

8. A method for transmitting data taken at the bottom of a well bore near the drill bit to the earth's surface through a large volume of the earth formation surrounding the well bore between the drill bit and the earth's surface, the steps comprising:
 (a) generating electrical power within the drill pipe responsive to drilling fluids pumped through the drill pipe;
 (b) generating sequential bursts of a first AC voltage in digital seuqence representing a digital information signal with use of such electrical power and with the digital being representative of a measured parameter occurring near the drill bit;
 (c) passing a first AC signal current impressed by said first AC voltage through a first electrode from said drilling string to be focussed outwardly and radially away from the well bore to form one path of initially horizontal current flow radially out through the drilling fluids and surrounding earth formation with the common path of said first AC current being said drill pipe; and
 (d) receiving and detecting a first AC signal potential resulting from said first AC signal current with a receiver/detection means connected to the drill pipe and to a receiver electrode located remote from the drilling string and electrically connected into said earth formation.

9. The method of claim 8 wherein said first electrode is a composite electrode comprising:
 (a) at least three spaced apart current electrodes disposed along the length of a pipe adapted to be included within a drilling string;
 (b) an electrically insulating jacket means disposed to insulate said current electrodes from said pipe and said drilling string for a designated distance along the side of said pipe away from said current electrodes;
 (c) electrical resistor means respectively connected between each said current electrode and a common electrical bus means;
 (d) electrical current source means connected to said bus means; and
 (e) each of said resistor means being adapted to provide a respective current to its respective electrode such that all the current electrodes may direct electrical currents equal in value.

10. The method of claim 8 further including the steps of:
 (a) detecting said first AC signal potential with detection means connected to the drilling string and to a second electrode exposed to the earth formation through said drilling fluid;
 (b) generating sequential bursts of a second AC signal voltage with use of separate electrical power and regulated by the digital information function of said first AC signal voltage to be of the same information function as said first AC signal voltage;
 (c) directing a second AC signal current impressed by said second AC signal voltage through a third electrode to be focussed outwardly and radially through the surrounding earth formation to form an initially horizontal path of said second AC signal current through such drilling fluids and earth formation with the common path of said second AC signal current being said drill pipe;
 (d) and receiving and detecting a second AC signal potential resulting from said second AC signal current with said receiver detection means.

11. The method of claim 10 further including the steps of impressing in reverse order said signals through the said respective electrodes to be received at the bottom of the well bore and processed to switch and/or calibrate apparatus.

12. The method of claim 10 wherein said first electrode and said third electrode are composite electrodes comprising:
 (a) at least three spaced apart current electrodes disposed along the length of a pipe adapted to be included within a drilling string;
 (b) an electrically insulating jacket means disposed to insulate said current electrodes from said pipe and said drilling string for a designated distance along the side of said pipe away from said current electrodes;
 (c) electrical resistor means respectively connected between each said current electrode and a common electrical bus means;
 (d) electrical current source means connected to said bus means; and
 (e) each of said resistor means being adapted to provide a respective current to its respective electrode such that all the current electrodes may direct electrical currents equal in value.

13. Telemetry apparatus for transmitting data taken at the bottom of a well bore near the drill bit to the earth's surface with one part of said telemetry appparatus being the metallic drilling string and with another part of said telemetry apparatus being a large volume of the earth formation surrounding the well bore between the drill bit and the earth's surface, the combination comprising:
 (a) detection means for generating sequential bursts of a first AC voltage indigital sequence to form a digital information signal representative of a measured parameter near said drill bit;
 (b) transmitter means including a first composite electrode for directing a first Ac signal current impressed by said first AC voltage from said first electrode to be focussed radially outwardly and laterally away from the well bore to form one path initially horizontal current flow radially out through the drilling fluids and surrounding earth formation with the common path of said first AC signal current being said drill pipe; and
 (c) surface receiver means connected to said drill pipe and a receiver electrode located remote from the drilling string and electrically connected into the earth formation for detecting a first AC signal potential resulting from a portion of the first AC signal current.

14. The apparatus of claim 13 further comprising:
 (a) detection means connected to the drilling string and to a second electrode exposed to the earth formation for detecting an AC signal potential from said first AC signal current;
 (b) second transmitter means for generating sequential bursts of a second AC signal voltage of frequency different from said first AC signal voltage and regulated by the repetition function of said first AC signal voltage to be of the same representative character as said first AC signal voltage;
 (c) a third electrode for directing a second AC signal current impressed by said second AC signal voltage outwardly radially through the surrounding drilling fluids and earth formation to form an initially horizontal path of said second AC signal current radially out through such earth formation with the common path of said second AC signal current being said drill pipe; and (d) said receiver detection means receiving and detecting a second AC signal potential resulting from said second AC signal current.

15. The apparatus of claim 14 further comprising means for impressing in reverse order said signals through the said respective electrodes to be received at the bottom of the well bore and processed to switch and/or calibrate apparatus.

16. A composite well logging electrode adapted to focus an electrical current outwardly and radially away from a well bore to form an initially horizontal path of electrical current flow radially out through drilling fluids and surrounding earth formation, comprising:

(a) at least three spaced apart current electrodes disposed along the length of a pipe adapted to be included within a drilling string;
(b) an electrically insulating jacket means dipposed to insulate said current electrodes from said pipe and said drilling string for a designated distance along the side of said pipe away from said current electrodes;
(c) electrical resistor means respectively connected between each said current electrode and a common electrical bus means;
(d) electrical current source means connected to said bus means; and
(e) each of said resistor means being adapted to provide a respective current to its repsective electrode such that all the current electrodes may direct electrical currents equal in value.

* * * * *